United States Patent [19]

Tani et al.

[11] Patent Number: 4,686,543

[45] Date of Patent: Aug. 11, 1987

[54] INFORMATION RECORDING MEDIUM

[75] Inventors: Yoshio Tani; Masao Yabe; Kyoichi Naruo, all of Shizuoka, Japan

[73] Assignee: Fuji Photo Film Co., Ltd., Kanagawa, Japan

[21] Appl. No.: 807,091

[22] Filed: Dec. 10, 1985

[30] Foreign Application Priority Data

Dec. 12, 1984 [JP] Japan .................. 59-260944

[51] Int. Cl.$^4$ ........................... G01D 15/34
[52] U.S. Cl. .................... 346/137; 428/65; 430/270; 369/284; 369/286; 369/288
[58] Field of Search ............. 346/135.1, 137; 428/64, 428/65; 430/270; 369/286, 288, 284

[56] References Cited

U.S. PATENT DOCUMENTS 4,414,273 11/1983 Wada et al. .............. 346/135.1 X
4,539,673 9/1985 Winslow ................. 346/135.1 X
4,616,238 10/1986 Tani et al. ................. 346/137

Primary Examiner—Alexander S. Thomas
Attorney, Agent, or Firm—Sughrue, Mion, Zinn, Macpeak & Seas

[57] ABSTRACT

An optical information recording medium is described, comprising two disc substrates, which are adhered directly or through a convex portion formed on at least one of the substrates or a spacer provided between the substrates by an adhesive layer, and a recording layer which is capable of recording and/or reading information by laser beam and which is provided on a surface of at least one of the substrates facing the other substrate, wherein the adhesive layer satisfies formulae (1), (2) and (3)

$$d/G \geq 0.05 \quad (1)$$

$$5 \times 10^2 \geq G \geq 5 \quad (2)$$

$$200 \geq d \geq 20 \quad (3)$$

wherein G is the coefficient of shearing elasticity (kg/cm$^2$) of the adhesive layer at 23° C., and d is the thickness (μm) of the adhesive layer.

6 Claims, 3 Drawing Figures

INFORMATION RECORDING MEDIUM

FIELD OF THE INVENTION

The present invention relates to an optical information recording medium capable of recording (writing) and/or reading information using high energy density laser beams. That is, the present invention relates to an optical disc useful for various uses such as a video disc, an audio disc, files of large volume of still images and disc memory for computers containing large volume information.

BACKGROUND OF THE INVENTION

Media for recording information using high energy density beams, such as laser beams, have recently been developed and become of practical use. Such media are generally referred to as optical discs and can be used as a video disc, an audio disc, and as files for a large volume of still images, as well as for disc memory for computers containing a large volume of information.

An optical disc essentially contains a transparent disc substrate composed of plastic or glass and a recording layer provided on the substrate composed of a metal such as Bi, Sn, In, or Te, or a semi-metal. A subbing layer composed of a polymeric substance is generally provided between the substrate and the recording layer to improve adhesion between the substrate and the recording layer, as well as to improve sensitivity of the optical disc.

Information can be written on an optical disc, for example, by irradiating a laser beam on the optical disc. That is, the irradiated area of the recording layer absorbs the laser beam, the temperature on the irradiated area increases higher, generating physical or chemical changes as well as optical characteristic changes of the recording layer, whereby information is recorded. Information can be read, for example, by irradiating a laser beam on an optical disc. It can also be reproduced, e.g., by detecting reflected light or transmitted light corresponding to a change of optical characteristics of the recording layer.

In the optical information recording medium, a laser beam focused to about a 1 μm diameter is irradiated on the surface of a disc to write and read information. If dirt is adhered on a recording layer or if a recording layer is scratched while the disc is handled, problems such as bit errors or dropouts readily occur. In this connection, a so-called "air sandwich structure", wherein two transparent disc substrates, each carrying a recording layer, are engaged through a spacer or a convex portion provided on the substrate for positioning two substrates carrying the recording layers facing each other in spaced relation has been proposed, as described in, for example, U.S. Pat. Nos. 4,074,282, 4,264,911 and 4,353,767.

Further, a so-called "directly adhered structure" wherein two transparent disc substrates carrying at least one recording layer are adhered directly with an adhesive layer so that the recording layer is provided inside surface of the substrate has been proposed, as described in, for example, Japanese Patent Application (OPI) Nos. 130243/82 and 133532/82 (the term "OPI" as used herein refers to a "published unexamined application").

However, when above-described discs are transported, used, and stored under different circumstances, various problems occur with changes in temperature, humidity, or air-pressures, due to use at different altitudes.

Particularly in a disc having an air sandwich structure, there are many problems. For instance, pressure differences occur between the inside space (air cavity) filled with inactive gas and the outside air, according to changes in temperatures or changes in air pressure according to the altitudes at which discs are used. As a result, the inside filled gas contracts or expands, thereby deforming substrates in some cases. Deformation of substrates easily leads to incapability of focus-servo devices and extreme deformation leads to peeling off of the adhered area of the substrates or to otherwise damaging the substrates.

Furthermore, due to the difference in the thermal expansion coefficient between a substrate and a spacer, shearing strain is added to an adhesive layer provided between the substrate and the spacer, and thus the substrate tends to be peeled off from the spacer. Still further, due to stress added to a substrate, the substrate is easily damaged. Even due to slight stress added to a substrate, double refraction may occur in the substrate, thereby deteriorating recording and playback of signals.

In a disc having directly adhered structure, if the thermal expansion coefficients of two substrates are different from each other, or if only one of two substrates is heated, the disc tends to deform or adhered areas of the substrates readily peel off.

When the above mentioned information recording disc is transported or used, or when the disc falls by error, as a result of impact, it often happens that substrates are damaged or broken, or the adhered areas of the substrates peel off, and double refraction due to stress occurs.

Very desirably, even under various conditions of temperature, humidity, and altitude, and even under rough handling conditions, including impacts, a disc should not be deformed, a substrate should not be damaged, and adhered areas should not be peeled off. Also, during use of a disc, out of focus conditions should not be caused by deterioration of the flatness of a disc, and recording and playback of signals should not be affected by double refraction.

To solve the above various problems, a method for providing an air hole in the optical disc having an air sandwich structure has been proposed, as described in Japanese Utility Model Application (OPI) Nos. 11613/80, 149535/82, 72765/83, 105041/83 and 105042/83.

This method can prevent the deformation of a disc caused due to a pressure difference between the inside space (air cavity) and the ambient air, but cannot, however, prevent peeling off of an adhered area due to a difference in the thermal expansion coefficient between a substrate and a spacer, nor the occurrence of double refraction due to stress to a substrate. Furthermore, this method creates serious problems that water vapor in the air enters into the inside space of a disc through such an air hole and deteriorates the recording layer, and similarly outside dirt and dust enter thereinto, generating errors.

Another method for using a spacer having the same thermal expansion coefficient with that of a substrate has been propsoed, as described in Japanese Patent Application (OPI) No. 143446/83. This method, however, cannot prevent deformation of a disc due to a pressure difference between the inside space and the outside ambient air, and selection of a spacer having a particular thermal expansion coefficient may be costly.

As another solution, a method for using a soft spacer as a center spacer has been proposed, as described in Japanese Patent Application (OPI) No. 71145/84. This method, however, cannot prevent deformation of a disc due to a pressure difference between the inside space and the outside ambient air, and use of a particular spacer is costly, too.

Another method involving making flexible a protective substrate disc which has no recording layer thereon and is positioned facing the other substrate disc carrying recording layer in air sandwich structure of a disc has been proposed, as described in Japanese Patent Application (OPI) No. 171048/84. In accordance with this method, peeling off of an adhered area caused due to pressure difference between the inside space and the outside ambient air can be prevented, but there is a disadvantage in that only one recording layer can be provided, and therefore the volume of information that can be recorded is reduced.

The present invention is to provide an optical information recording medium to solve the above problems.

SUMMARY OF THE INVENTION

An object of the present invention is to provide an optical information recording medium wherein a disc is not deformed, substrates are not damaged, and adhered areas of a substrate are not peeled off, under various environmental conditions (e.g., with respect to temperature, humidity, and altitude) and various handling conditions (e.g., with respect to impacts).

Another object of the present invention is to provide an optical information recording medium wherein out of focus conditions due to deterioration of flatness do not occur and recording and playback of signals are not affected by increases of double refraction.

Accordingly, the present invention is directed to an optical information recording medium comprising two disc substrates, which are adhered directly or through a convex portion formed on at least one of the substrates or a spacer provided between the substrates by an adhesive layer, and a recording layer which is capable of recording and/or reading information by laser beam and which is provided on a surface of at least one of the substrates facing the other substrate, wherein the thickness d ($\mu$m) and the shearing elasticity coefficient G (kg/cm$^2$) at 23° C. of said adhesive layer satisfy the following formulae (1), (2), and (3) in order to prevent disc deformation, substrate damage, and increase of double refraction.

$$d/G \geq 0.05 \quad (1)$$

$$5 \times 10^2 \geq G \geq 5 \quad (2)$$

$$200 \geq d \geq 20 \quad (3)$$

DETAILED DESCRIPTION OF THE INVENTION

The structure of the optical information recording medium may include a structure such that two substrates, at least one of which is provided with a recording layer facing inside, are engaged by an adhesive layer and a so-called "air sandwich structure" wherein two substrates, at least one of which is provided with a recording layer facing the other substrate, are engaged by an adhesive layer through a convex portion formed on the substrate(s) or a spacer provided between the two substrates so that a sealed space between the substrates is formed.

In the optical recording information medium having the above described structures, as laser light passing through a substrate impinges on the surface of the recording layer which is out of contact with the air for recording or playback of information, the recording layer is free from receiving physical and chemical damages, and from dirt adhering on the surface of the recording layer, which may interfere with recording and playback.

Figure 1:
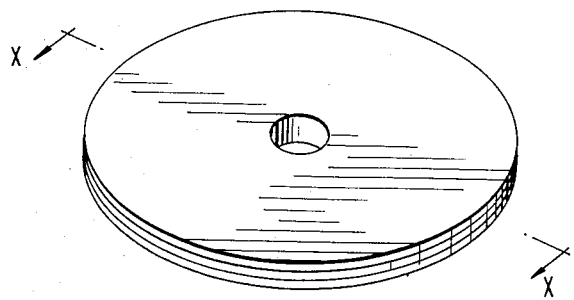
FIG. 1 is a perspective view showing one embodiment of an information recording medium having an air sandwich structure.
Figure 2:
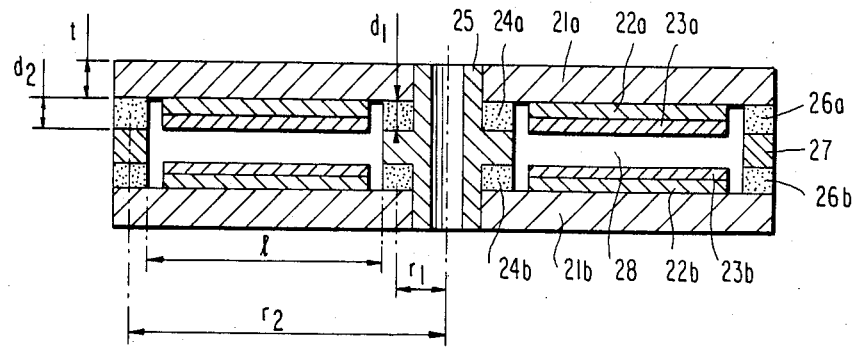
FIG. 2 is a cross-sectional view of FIG. 1 cut along X—X line in FIG. 1.

The information recording medium having an air sandwich structure has a perspective view as shown in FIG. 1 and has a cross-sectional view as shown in FIG. 2.

That is, the two disc substrates 21a and 21b are provided with subbing layers 22a and 22b, and recording layers 23a and 23b, respectively. The two substrates are engaged and supported by an inner annular spacer 25 and an outer annular spacer 27 through adhesive layers 24a, 24b, 26a, and 26b. Thus, a sealed space (air cavity) 28 is formed by the two substrates 21a and 21b, together with the inner and outer spacers 25 and 27.

Substrates and spacers are firmly adhered by adhesive layers. In the conventional information recording medium having an air sandwich structure, the physical properties and the thickness of the adhesive layer were not critically investigated and many problems arose therefrom, as described above.

In general, durability of information recording media is required under temperature and altitude conditions as shown in the following Table 1. In Table 1, the allowable pressure difference is the value measured when gas having temperature of 23° C. was filled into the sealed space upon preparing the recording medium.

TABLE 1

|  | Temperature (°C.) | Pressure Difference (kg/mm$^2$) |
|---|---|---|
| Use Condition | 10 to 45 | −0.04 to 0.07 |
| Storage Condition | 10 to 45 | −0.04 to 0.07 |
| Transportation Condition | −20 to 60 | −0.15 to 0.13 |

|  | Altitude (m) | Pressure Difference (kg/mm$^2$) |
|---|---|---|
| Use Condition | −300* to 2,000 | −0.04 to 0.215 |
| Storage Condition | −300* to 3,700 | −0.04 to 0.37 |
| Transportation Condition | −300* to 3,700 | −0.04 to 0.37 |

*i.e., 300 m under the sea level

Under the above-described storage and transportation conditions, an adhesive layer should not be peeled off and substrates should not be damaged. Under the above-described use conditions, the readability of written information should not be affected by flatness deterioration and double refraction which are caused with changes in temperature.

It has become possible to eliminate the above problems by providing physical properties in an adhesive layer, particularly the shearing elasticity coefficient and the thickness of the adhesive layer, within predetermined ranges.

In a recording disc having an air sandwich structure as shown in FIG. 2, shearing streass and peeling stress provided on an adhesive layer are experimentally represented by the formulations:

$$A_1 = \frac{r_1(\gamma_1 - \gamma_2)\Delta T}{\left(K_1 S_1 + \frac{d_1}{G_1}\right)},$$

$$A_2 = \frac{r_2(\gamma_1 - \gamma_2)\Delta T}{\left(K_2 S_2 + \frac{d_2}{G_2}\right)},$$

$$B_1 = \frac{K_3 l \Delta P}{t^3 \left(K_4 + \frac{d_1}{G_1}\right)}, \text{ and}$$

$$B_2 = \frac{K_3 l \Delta P}{t^3 \left(K_4 + \frac{d_2}{G_2}\right)}$$

wherein:
$A_1$ is shearing stress caused by the difference in thermal expansion coefficient between a substrate and an inner spacer;
$A_2$ is shearing stress caused by the difference in thermal expansion coefficient between a substrate and an outer spacer;
$B_1$ is peeling stress to an inner spacer caused by the difference in pressure between an inside space and outside ambient air;
$B_2$ is peeling stress to an outer spacer caused by the difference in pressure between an inside space and outside ambient air;
$\gamma_1$ and $\gamma_2$ are thermal expansion coefficients of the substrates and spacers, respectively;
$d_1$ and $d_2$ are thicknesses of an adhesive layer used for engaging inner and outer spacers, respectively;
$G_1$ and $G_2$ are shearing elasticity coefficients of adhesive layers on inner and outer spacers, respectively;
$t$ is the thickness of a substrate;
$S_1$ and $S_2$ are adhered areas of inner and outer spacers, respectively;
$r_1$ and $r_2$ are radii from the central axis to the midpoints of the inner and outer spacers, respectively;
$l$ is the distance of the air cavity (spaced distance);
$K_1$ and $K_2$ are fixed numbers determined by the shape, Young's modulus and Poisson's ratio of the substrates and the spacers;
$K_3$ and $K_4$ are fixed numbers determined by the shape of the substrates;
$\Delta P$ is the pressure difference between the outside ambient air and the inside space of the air sandwich structure; and
$\Delta T$ is the change in temperature based on the temperature at which an optical information recording medium has been prepared.

It is clear from the above formulae that as the ratio (d/G) of the thickness d to the shearing elasticity coefficient G of an adhesive layer increases, the shearing stress A and peeling stress B added to an adhesive layer decrease.

That is, as the thickness d of the adhesive layer is relatively higher, and as shearing elasticity coefficient G is relatively smaller, the shearing stress A and peeling stress B become smaller.

However, when G becomes too small and d becomes too high, problems can occur, such as that the disc rotates undulatingly, and that the disc is not well balanced.

Thus, by selecting the thickness d and shearing elasticity coefficient G of the adhesive layer to meet the above described formulae (1), (2), and (3), an optical information recording medium can be used, stored and transported without any problems even under those conditions as shown in Table 1. The preferred relation between d and C is as follows:

$100 \geq G \geq 10$ and $100 \geq d \geq 40$

Figure 3:
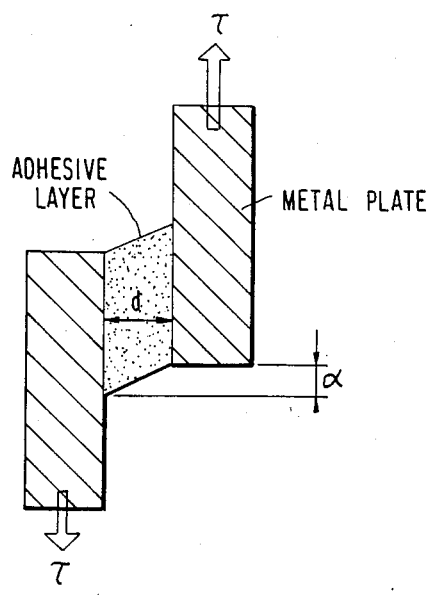
FIG. 3 illustrates measurement of the shearing elasticity coefficient G of the adhesive layer.

The shearing elasticity coefficient G of the adhesive layer can be measured in a conventional manner. That is, two metal plates are bonded using an adhesive agent to be measured, and shearing stress $\tau$ (kg/cm$^2$) and shear $\alpha$ ($\mu$m) are measured when the two metal plates bonded with the adhesive layer (thickness: d $\mu$m) are pulled in opposite directions, respectively, parallel to the adhered surface thereof, as shown in FIG. 3. The shearing elasticity coefficient G is calculated by the following equation:

$$G = \frac{\tau \times d}{\alpha}$$

The information recording medium of the present invention can be prepared in accordance with the following method.

A substrate of the present invention can be optionally selected from those materials which are commonly used for information recording medium. However, in view of optical properties, flatness, molding properties, handling properties, stabilities with time passage and manufacturing costs, preferred materials for substrates include glass, such as tempered glass or nontempered glass; an acrylic resin, such as cellcast polymethyl methacrylate or injection-molded polymethyl methacrylate; vinyl chloride type resin, such as polyvinyl chloride or copolymer of vinyl chloride; and polycarbonate. Of these materials, preferred materials are glass, polycarbonate and an acrylic resin, from the viewpoint of writing and/or reading information.

A subbing layer underlying a recording layer can be provided on a substrate in order to improve flatness and adhesive strength to a recording layer, to increase sensitivity due to a heat insulating effect, and to prevent quality change of a recording layer.

On the surface of the subbing layer, a pregroove can be provided to secure tracking upon writing and/or reading, as described in Japanese Patent Publication No. 37922/82.

Materials for forming a subbing layer include, for example, a polymeric substance, such as polymethyl methacrylate, copolymers of acrylic acid and methacrylic acid, copolymers of styrene and maleic anhydride, polyvinyl alcohol, copolymers of N-methylol acrylamide, styrene and vinyl sulfonate, copolymers of styrene and vinyl toluene, chlorinated polyethylene, chlorosulfonated polyethylene, nitrocellulose, polyvinyl chloride, polyester, polyimide, copolymers of vinyl acetate and vinyl chloride, copolymers of ethylene and vinyl acetate, polyethylene, polypropylene, and polycarbonate.

A resin hardened by radiation such as cross-linkable acrylate compositions as described in Japanese Patent Application (OPI) No. 178637/84 can also be used for the subbing layer. The cross-linkable acrylate compositions contain a monomer having at least two unsaturated bonds such as diacrylates, triacrylates, tetraacrylates or mixture thereof with or without other monomers such as monoacrylates or N-vinylpyrrolidone. The acrylate compositions further contain a catalyst or a photo-reaction initiator, e.g., benzoin isobutyl ether. Of these, hexanediol diacrylate is particularly preferably used since it has good form stability when cross-linked.

A subbing layer can be formed by dissolving or dispersing the above-described polymeric substance in a solvent to prepare a coating composition, which is then coated on a substrate by a coating method such as a spin coating method, a dip coating method, an extrusion coating method, a bar coating method, or a screen printing method.

Alternatively, a subbing layer is formed on a stamper by a coating method such as a spin coating method, a dip coating method, an extrusion coating method, a bar coating method or a screen printing method, a substrate is adhered thereto by a radiation hardenable adhesive agent or a thermoplastic adhesive agent, and then stripped off therefrom to provide a pregrooved substrate.

Alternatively, a subbing layer can be formed by injecting the radiation hardenable resin between a substrate and a stamper, followed by exposure to electron beams and ultraviolet rays.

The thickness of a subbing layer is generally from 0.01 to 100 μm, and preferably from 0.1 to 10 μm.

Subsequently, a recording layer is provided on a subbing layer.

Materials for a recording layer include metals such as Te, Zn, In, Sn, Zr, Al, Cu, and Ge; semi-metals such as Bi, As, and Sb; semiconductors such as Ge and Si; alloys of the foregoing metals; and combination thereof. Sulfides, oxides, boron compounds, carbides, silicates or nitrides of those metals or semi-metals and a mixture of those compounds and metals can also be used as a material for a recording layer. These materials are described in U.S. Pat. Nos. 4,388,400, 4,271,256, 4,415,650 and 4,237,468.

A recording layer can be formed on a substrate directly or through a subbing layer by a method such as a sputtering method or an ion plating method. A recording layer can be a single layer or a multilayer. The thickness thereof is generally in the range of from 100 to 5,500 Å in view of optical density required for optical information recording. A recording layer can be provided on both of the substrates, or on only one of the substrates.

In case of an information recording medium used only for playback, fine concave and convex areas corresponding to the information are formed beforehand on one surface of a substrate using a stamper, followed by formation of a layer composed of a reflective substance such as Al or Cu.

On the surface of a substrate opposite surface to a recording layer, a thin film composed of inorganic substances such as silicon dioxide, tin oxide, tin fluoride, or magnesium fluoride can be provided by a vapor deposition method or a sputtering method to improve scratch resistance and moisture resistance, as described in U.S. Pat. No. 4,449,138.

Two substrates provided with a recording layer respectively are engaged through a spacer with surfaces of recording layers facing each other inside. That is, two substrates are adhered through an outer spacer and an inner spacer using an adhesive agent under the air or inaative gas.

Materials for the spacer are not particularly limited, and aluminum metal, an aluminum alloy, or plastics such as acryl resins, polycarbonate resins and epoxy resins may be used, with aluminum metal and an aluminum alloy being preferred. The aluminum metal or aluminum alloy spacer is preferably subjected to an anodic oxidation treatment.

A surface of a spacer made of aluminum metal subjected to anoidic oxidation treatment can further be subjected to a boiling water treatment, an alkali treatment, discharge treatment, a sandblast treatment, a surface oxidation treatment, or can be coated with a silane coupilng agent. By such surface treatment, affinity between the aluminum metal spacer subjected to anodic oxidation treatment and an adhesive agent can be improved, and also the appearance of the spacer is improved.

Substrates are bonded with a spacer by an adhesive agent. An adhesive agent can be various known adhesive agents.

The adhesive agent is, for example, a radiation hardenable adhesive agent (including an ultraviolet ray hardenable adhesive agent), a thermosetting adhesive agent (particularly an epoxy type adhesive agent), thermoplastic adhesive agent, or an elastomeric adhesive agent.

Examples of radiation hardenable adhesive agents include acrylic acid, methacrylic acid, acrylic acid esters, methacrylic acid esters, acrylamide, methacrylamide, acrylonitrile, and derivatives thereof; acrylic or methacrylic acid esters of polyhydric alcohols; and mixture thereof.

Above-described radiation hardenable adhesive agents are generally used with a sensitizing agent. Examples of sensitizing agents are benzoin alkyl ether, benzyl ketal, acetals, acetophenone derivatives, benzophenone derivatives, xanthone derivatives, thioxanthone derivatives, anthraquinone derivatives, and benzaldehyde derivatives. These sensitizing agents can be used alone or in combination.

Examples of epoxy type adhesive agents include bisphenol A type epoxy adhesive agent, such as a reaction product of bisphenol A and epichlorohydrin; novolak type epoxy resin, such as a reaction product of novolak resin and epichlorohydrin; polyphenol type epoxy resin, such as a reaction product of a polyphenol resin and epichlorohydrin; polyhydroxybenzene type epoxy resin, such as a reaction product of polyhydroxybenzene and epichlorohydrin; oxocarboxylic acid type epoxy resin, such as a reaction product of oxybenzoic acid and epichlorohydrin; aromatic carboxylic acid type epoxy resin, such as a reaction product of phthalic acid and epichlorohydrin; an epoxy resin of an epoxy group-containing vinyl compound, such as a reaction product of glycidylmethacrylate and epichlorohydrin;

an epoxy group-containing vinyl derivative, such as a reaction product of epoxystyrene and styrene; an epoxy resin of allyl glycidyl ether-vinyl monomer copolymers; an epoxy resin of polyethylene glycol-polypropylene glycolethylene oxide copolymers; an epoxy resin of cyclopentadiene; a nitrogen-containing epoxy resin; an epoxy resin having a nitrogen-containing epoxy ring; a metal-containing epoxy resin; and metal chelates.

The thickness and shearing elasticity coefficient of the resulting adhesive layer should meet the formulations (1), (2), and (3). While shearing elasticity coefficient of the radiation hardenable adhesive agents is generally about 1,000 kg/cm$^2$ when hardened, the shearing elasticity coefficient can be lowered proportionally by the addition of oligomers having a low glass transition point in the adhesive agent. For example, oligomers represented by the following general formula can be used for the purpose:

$$CH_2=CH+HNRNHCOOR'OOC+_nCH=CH_2$$

wherein R represents

R' represents the group represented by $$+(-CH_2)_l\overset{O}{\overset{\|}{OC}}+CH_2)_4\overset{O}{\overset{\|}{CO}}_{m1}(CH_2)_{m2}\overset{O}{\overset{\|}{OCNH}}-R-NH-\overset{O}{\overset{\|}{CO}}-CH_2CH_2-$$

(wherein l is 4 to 6 and m$_1$ and m$_2$ each is 1 to 5) and n is 1. On the other hand, the epoxy type adhesive agents generally have the shearing elasticity coefficient, when hardened, of about 40,000 kg/cm$^2$, and the shearing elasticity coefficient can be lowered by the addition of polyamide resins.

The present invention is illustrated in more detail by the following examples.

EXAMPLE 1

As a substrate, a potash tempered glass disc having a 305 mm diameter and 1.3 mm thickness and a punched hole having 80 mm diameter in its center was used. In and GeS (5/3 weight ratio) was vapor deposited thereon to form a recording layer. An aluminum spacer, the surface of which was subjected to anodic oxidation, was used. Two substrates were adhered through an aluminum spacer by an ultraviolet ray hardenable adhesive agent to construct an optical information recording medium. The ultraviolet ray hardenable adhesive agent has the following composition. Shearing elasticity coefficient of the adhesive agent was adjusted to a desired value by increasing the amount of an oligomer having a low glass transition point. Shearing elasticity coefficient G of the hardened compound (Composition I) was 12 kg/cm$^2$ and that of the hardened compound (Composition II) was 98 kg/cm$^2$.

| Component | Composition I | Composition II |
|---|---|---|
| $CH_2=CH+HNRNHCOOR'OOC)_{\overline{n}}CH=CH_2$* (molecular weight: about 1000) | 30% | 10% |
| $CH_2=CH$ \| $COOCH_2-CH-CH_2-$⌬ \| $OH$ | 20% | 20% |
| $\overset{CH_3}{\underset{\|}{CH_2=C}}$ \| $COOC_2H_4OH$ | 20% | 20% |
| $CH_2=CH-COO-CH_2$-(tetrahydrofuryl) | 27% | 47% |
| $\overset{CH_3}{\underset{\|}{CH_2=C}}$ \| $COO(CH_2)_3-Si-(OCH_3)_3$ | 1% | 1% |
| $CH_3-\overset{CH_3}{\underset{\underset{OH}{\|}}{\overset{\|}{C}}}-\overset{O}{\overset{\|}{C}}$-⌬ | 2% | 2% |

*R, R' and n defined above.

The results of evaluations on this optical information recording medium are shown in Table 2.

TABLE 2

| | Sample No. | | | | | |
|---|---|---|---|---|---|---|
| | 1 | 2 | 3 | 4 | 5 | 6 |
| Adhesive layer | | | | | | |
| G (kg/cm$^2$) | 12 | 98 | 12 | 98 | 12 | 98 |
| d (μm) | 5 | 5 | 50 | 50 | 500 | 500 |

TABLE 2-continued

| | Sample No. | | | | | |
|---|---|---|---|---|---|---|
| | 1 | 2 | 3 | 4 | 5 | 6 |
| d/G | 0.42 | 0.05 | 4.17 | 0.51 | 41.7 | 5.10 |
| Peel off of adhered area | | | | | | |
| 60° C., 90% RH | C | C | A | A | C | C |
| −20° C. | C | C | A | A | B | B |
| Damage of substrates | | | | | | |
| 60° C., 90% RH | A | A | A | A | A | A |
| −20° C. | A | A | A | A | A | A |
| Deformation of disc and out of focus condition | | | | | | |
| 45° C. | A | A | A | A | A | A |
| 10° C. | A | A | A | A | A | A |

In Table 2, "A" indicates that 5 discs had no problems (i.e., peeling off of the adhered areas of the substrates, damaging of the substrates or out of focus conditions due to deterioration of flatness), "C" means that all of 5 discs had problems, and "B" means that among 5 discs, problems occurred in from 2 to 4 discs.

EXAMPLE 2

An optical information recording medium was constructed in the same manner as in Example 1 except using an epoxy type adhesive agent instead of the ultraviolet ray hardenable adhesive agent of Example 1. The results of evaluations are shown in Table 3. As an epoxy type adhesive agent, diglycidyl ether, which is a reaction product of bisphenol A and epichlorohydrin, was used, and a polyamide resin having the following chemical structure was added thereto in amounts of 50 wt % and 25 wt %, respectively, based on the total weight of diglycidyl ether and polyamide resin to adjust shearing elasticity coefficient. Shearing elasticity coefficients of the hardened compounds were 483 kg/cm$^2$ and 975 kg/cm$^2$, respectively.

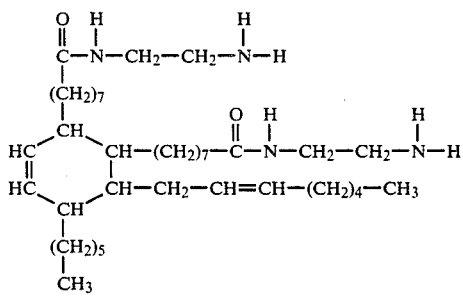

TABLE 3

| | Sample No. | | | | | |
|---|---|---|---|---|---|---|
| | 7 | 8 | 9 | 10 | 11 | 12 |
| Adhesive layer | | | | | | |
| G (kg/cm$^2$) | 483 | 975 | 483 | 975 | 483 | 975 |
| d (μm) | 5 | 5 | 50 | 50 | 500 | 500 |
| d/G | 0.01 | 0.005 | 0.10 | 0.05 | 1.04 | 0.51 |
| Peel off of adhered area | | | | | | |
| 60° C., 90% RH | C | C | A | C | B | C |
| −20° C. | C | C | A | C | A | C |
| Damage of substrates | | | | | | |
| 60° C., 90% RH | A | C | A | A | A | A |
| −20° C. | A | C | A | A | A | A |
| Deformation of disc and out of focus conditions | | | | | | |
| 45° C. | B | C | A | A | B | A |
| 10° C. | B | C | A | A | B | A |

The effects of the present invention based on the foregoing examples are described below.

1. Under the storage and transportation conditions as shown in Table 1, peel off from the adhered area and damage to the substrates did not occur.

Due to difference in pressure between an inside space and an outside ambient air in the disc having an air sandwich structure with changes in temperature and pressure, stress is added to a substrate and peeling stress is added to an adhesive layer. In the present invention, stress can be relieved by adjusting G and d to predetermined ranges, whereby damage of substrates and peel off from the adhered area can be prevented.

Due to differences in the thermal expansion coefficients of the substrates and spacers with changes in temperature, shearing stress is added to substrates and spacer. However, in the present invention, the stress can be relieved by the adhesive layer, whereby peel off from the adhered area and damage of substrates can be prevented.

2. Under the storage and transportation conditions as shown in Table 1, flatness deterioration and double refraction increase can be prevented, thereby not affecting characteristics of recording and playback.

The difference in thermal expansion between a substrate and a spacer caused with changes in temperature (high temperature and low temperature) causes shear strain, which can be absorbed by the adhesive layer. Therefore, disc deformation, i.e., flatness deterioration, can be prevented. Additionally, stress added to a substrate can be reduced, thereby preventing occurrence of double refraction.

3. Damage to discs due to impact can be prevented. Even when a disc falls from a desk or a shelf by error, damage of a substrate can be prevented by absorbing the impact with an adhesive layer. This phenomenon is particularly remarkable when the substrate is a glass.

While the invention has been described in detail and with reference to specific embodiments thereof, it will be apparent to one skilled in the art that various changes and modifications can be made therein without departing from the spirit and scope thereof.

What is claimed is:

1. An optical information recording medium comprising two disc substrates, which are adhered directly or through a convex portion formed on at least one of the substrates or a spacer provided between the substrates by an adhesive layer, and a recording layer which is capable of recording and/or reading information by laser beam and which is provided on a surface of at least one of the substrates facing the other substrate, wherein the adhesive layer satisfies formulae (1), (2), and (3)

$$d/G \geq 0.5 \qquad (1)$$

$$5 \times 10^2 \geq G \geq 5 \qquad (2)$$

$$200 \geq d \geq 20 \qquad (3)$$

wherein G is the coefficient of shearing elasticity (kg/cm$^2$) of the adhesive layer at 23° C., and d is the thickness (μm) of the adhesive layer.

2. An optical information recording medium as in claim 1, wherein the medium has an air sandwich structure.

3. An optical information recording medium as in claim 1, wherein the adhesive layer satisfies the formulae (2') and (3'):

$$100 \geq G \geq 10 \qquad (2')$$

$$100 \geq d \geq 40 \qquad (3')$$

4. An optical information recording medium as in claim 3, wherein the medium has an air sandwich structure.

5. An optical information recording medium as in claim 1, wherein the adhesive layer is formed of an adhesive agent selected from the group consisting of a radiation hardenable adhesive agent, a thermosetting adhesive agent, a thermoplastic adhesive agent, and an elastomeric adhesive agent.

6. An optical information recording medium as in claim 5, wherein the adhesive layer is formed of an epoxy type adhesive agent.

* * * * *